United States Patent [19]

Lonardi et al.

[11] Patent Number: 4,827,689

[45] **Date of Patent: * May 9, 1989**

[54] AUTOMATED APPARATUS FOR LINING THE WALL OF A VESSEL WITH BRICKS

[75] Inventors: Emile Lonardi, L-Bascharage; Michael Kirchen; Victor Kremer, both of L-Luxembourg, all of Luxembourg

[73] Assignee: Paul Wurth S.A., Luxembourg

[ * ] Notice: The portion of the term of this patent subsequent to Aug. 25, 2004 has been disclaimed.

[21] Appl. No.: 3,775

[22] Filed: Jan. 16, 1987

[30] Foreign Application Priority Data

Jan. 28, 1986 [LU] Luxembourg .......................... 86272

[51] Int. Cl.[4] .............................................. B65G 61/00

[52] U.S. Cl. ........................................ 52/749; 52/747; 414/10

[58] Field of Search ...................... 52/747, 749; 414/10

[56] References Cited

U.S. PATENT DOCUMENTS

| | | | |
|---|---|---|---|
| 3,287,875 | 11/1966 | Lakin | 52/747 |
| 3,298,154 | 1/1967 | Behr | 414/10 |
| 3,735,546 | 5/1973 | Newman | 414/10 |
| 3,757,484 | 9/1973 | Williamson et al. | 52/749 |
| 3,888,062 | 6/1975 | Gregord et al. | 52/749 |
| 3,927,502 | 12/1975 | Smith | 52/749 |
| 4,226,563 | 10/1980 | Horikawa et al. | 52/749 |
| 4,688,773 | 8/1987 | Legille et al. | 266/281 |
| 4,708,562 | 11/1987 | Mélan et al. | 414/10 |
| 4,720,226 | 1/1988 | Legille et al. | 414/10 |

FOREIGN PATENT DOCUMENTS

| | | | |
|---|---|---|---|
| 3123582 | 6/1981 | Fed. Rep. of Germany . | |
| 1325256 | 3/1963 | France . | |
| 1380923 | 10/1964 | France . | |
| 2070868 | 9/1971 | France . | |
| 676619 | 7/1979 | U.S.S.R. | 414/10 |

*Primary Examiner*—David A. Scherbel
*Assistant Examiner*—Caroline D. Dennison
*Attorney, Agent, or Firm*—Fishman, Dionne & Cantor

[57] ABSTRACT

A brick-laying apparatus comprises a work platform vertically movable within a vessel and capable of rotating about the vertical axis of the vessel; and a robot for manipulating and laying bricks along the brick lining of the wall. The robot is mounted on a support capable of pivoting about a first vertical axis. To increase the effective radius of the robot, the support is mounted on an extension piece pivotable about a second vertical axis. The brick-laying apparatus is particularly well suited for repairing the refractory covering of a metallurgical converter.

2 Claims, 2 Drawing Sheets

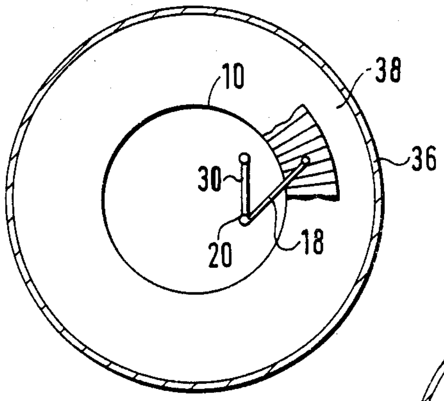
Fig.3
Fig.2
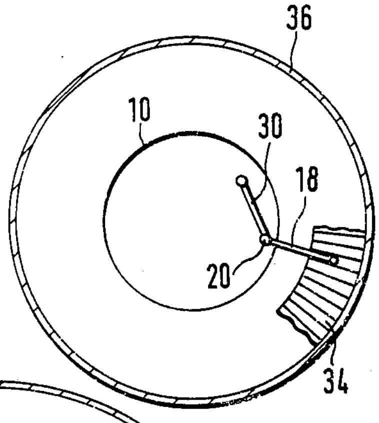
Fig.4
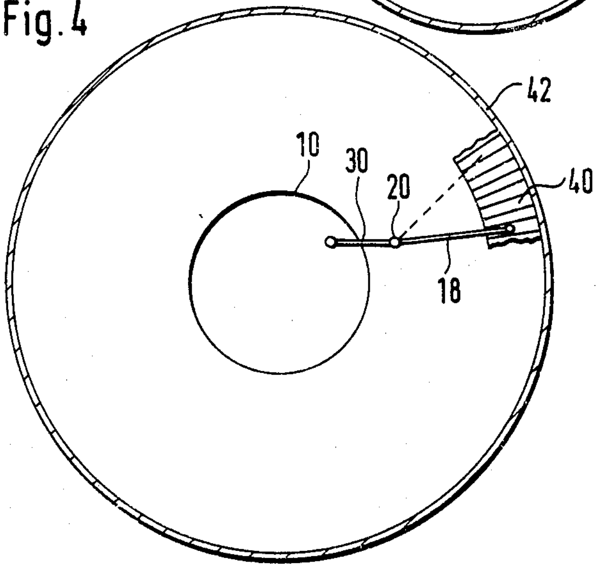

AUTOMATED APPARATUS FOR LINING THE WALL OF A VESSEL WITH BRICKS

BACKGROUND OF THE INVENTION

This invention relates to an automated apparatus for lining the inner wall of a vessel with bricks. More particularly, this invention relates to a brick laying apparatus comprising a work platform which is vertically movable within the vessel and capable of rotating about the vertical axis of the latter; and a robot for manipulating and laying bricks along the brick lining of the wall, the robot being mounted on a support pivotable about a first vertical axis.

Several apparatuses for lining the inner wall of a vessel with bricks of the general type described above have already been proposed. For example, in Luxembourg patent application numbers 86,114, (corresponding to U.S. Application Ser. No. 915,635 filed Oct. 6, 1986, now U.S. Pat. No. 4,708,562), 86,189 (corresponding to U.S. Application Ser. No. 937,587 filed Dec. 3, 1986, now U.S. Pat. No. 4,720,226), and 86,188 (corresponding to U.S. Application Ser. No. 937,646 filed Dec. 3, 1986, now U.S. Pat. No. 4,758,036) all of which are assigned to the assignee hereof and are fully incorporated herein by reference, brick laying devices are disclosed for the repair of converters. In all of these apparatuses, the general problem of overcrowding on the work platform is present. In fact, such a work platform must provide storage zones for at least two pallets of bricks, means of raising and lowering the pallets, such as a system with winches and cables, a control booth for an operator, and usually an automatic brick depalletization mechanism. Moreover, these devices must leave the necessary room for the installation of a robot for manipulating and laying the bricks and, above all, the space which the robot needs to execute the required movements. Because the overall size of the work platform does not change with the size of the converters, the problem of overcrowding on the platform is more serious as the size of the converter decreases. In other words, space available for the robot decreases with the size of the converter.

For repairing small converters, a robot of reduced size must therefore be provided. However, this gives rise to the disadvantage that the same apparatus cannot be used to repair converters of larger size, because the effective radius of such a smaller robot is inadequate.

SUMMARY OF THE INVENTION

The above-discussed and other problems and deficiencies of the prior art are overcome or alleviated by the bricklaying apparatus of the present invention. In accordance with the present invention, a new apparatus is provided which does not suffer from the disadvantages described above; is equipped with a robot which makes do with the available space; and can be used, without modification, for repairing converters of differing sizes.

The present invention comprises a work platform which is vertically movable within a vessel (i.e. a converter) and is capable of rotating about the vertical axis of said vessel. A robot is provided for manipulating and laying bricks along the brick lining of the wall, the robot being mounted on a support pivoting about a first vertical axis. In accordance with a significant feature of the present invention, the pivoting support is mounted on an extension piece which can pivot about a second vertical axis.

The pivoting of the support about the second vertical axis makes it possible to increase or decrease the effective radius of the robot. This allows a robot of reduced size to be used, thus providing the twofold advantage that the apparatus of the present invention may be used to repair converters of small size; and that the same apparatus (with the small robot) can be used in larger converters.

The above-discussed and other features and advantages of the present invention will be appreciated and understood by those skilled in the art from the following detailed description and drawings.

BRIEF DESCRIPTION OF THE DRAWINGS

Referring now to the drawings, wherein like elements are numbered alike in the several FIGURES:

FIGS. 2 and 3 are diagrammatic plan views of the use of the robot in a vessel of reduced diameter, with the possibility of lining with bricks sections of different radii; and

FIG. 4 is a diagrammatic plan view showing the use of a robot in a vessel of a size larger than that of FIGS. 2 and 3.

DESCRIPTION OF THE PREFERRED EMBODIMENT

Figure 1:
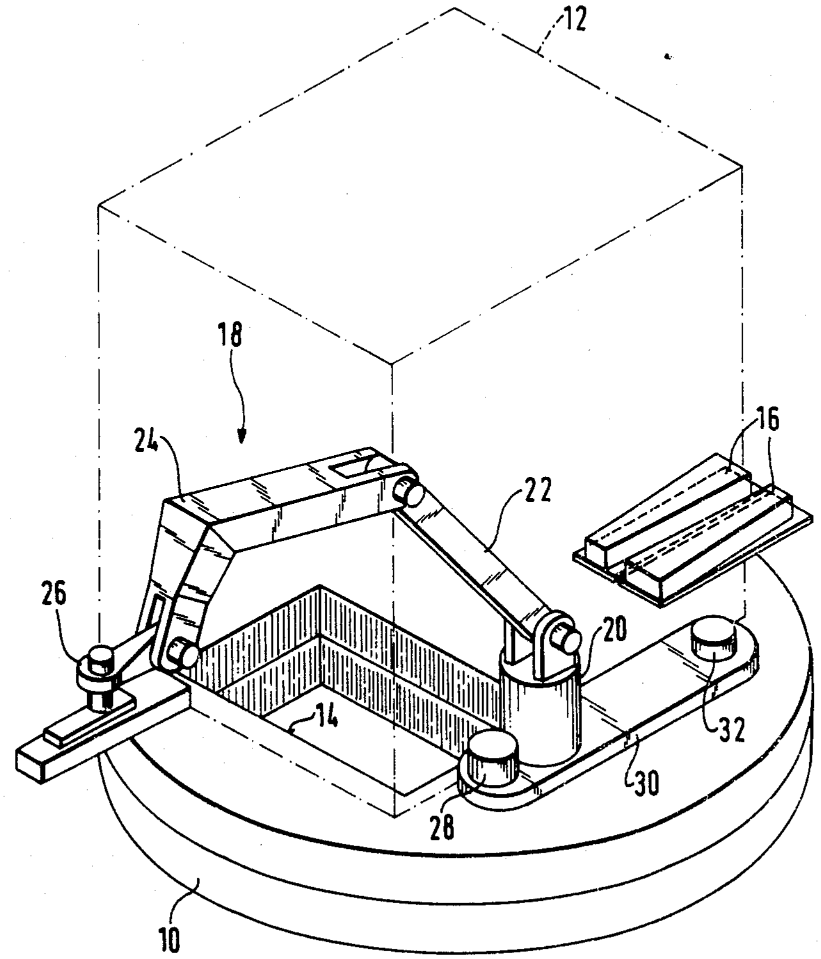
FIG. 1 is a partial diagrammatic perspective view of an apparatus in accordance with the present invention.

FIG. 1 shows a circular platform 10 suspended or supported by means known per se (not shown), so as to be capable of rotating about its vertical axis and being moved vertically along the latter within a vessel to be lined with bricks (such as a metallurgical converter).

Reference numeral 12 identifies the imaginary space reserved for brick-pallet storage zones, means of raising and lowering the pallets, a control booth for an operator and an automatic brick depalletization mechanism. An orifice 14 in platform 10 is provided for the passage of the pallets (see, for example, U.S. Application Ser. Nos. 937,587 and 915,635).

In the illustrated example, the automatic depalletization mechanism moves the bricks 16 from the pallets towards an intermediate storage zone easily accessible for a robot 18 manipulating the bricks 16. Robot 18, installed on platform 10, transfers bricks 16 from the intermediate storage zone to their intended location along the wall of the converter.

Robot 18 is mounted on a support 20 capable of rotating about a vertical axis under the action of a motor 28. Robot 18 is comprised of a first arm 22 articulated on support 20 by means of a horizontal pivot pin and a second arm 24 connected to the first arm 22 by means of a hinge with a horizontal pivot pin. A brick manipulation head 26 is connected to the end of the second arm 24 by means of a second hinge with a horizontal pivot pin. The manipulation head 26 can have tongs or a suction cup for grasping, transporting and laying bricks 16 (see, for example U.S. Application Ser. No. 937,646).

In accordance with an important feature of the present invention, support 20 (carrying robot 18) is not mounted directly on platform 10, but on the end of an extension piece 30, the other end of which is mounted on a pivot so as to be rotatable, under the action of a motor 32, about a vertical axis parallel to the vertical axis of the support 20.

FIG. 2 shows the angular positions of robot 18 and extension piece 30 relative to one another on platform 10 for laying a ring of bricks 34 along the inner wall of a converter 36 of relatively small cross-section. In this arrangement, extension piece 30 occupies a specific angular position relative to a diametral axis of platform 10, while robot 18 can pivot about its support 20 in order to service a particular sector of the ring of bricks.

FIG. 3 shows the arrangement of the robot for laying a ring of bricks 28 in the same converter 36, but a location of smaller cross-section, for example in the upper region of the converter. In this arrangement, the extension piece 30 occupies a completely retracted position, that is, a position parallel to a diametral axis of platform 10.

FIG. 4 shows the use of the present invention for lining a converter 42 of large cross-section with bricks. In order to lay a peripheral ring 40 of bricks, it will be understood that extension piece 30 will occupy a completely clear position after pivoting 90° relative to the retracted position shown in FIG. 3. It will also be appreciated, that, whatever the size of the converter, the space required for siting the robot is reduced to a minimum on platform 10. Also, all of the robot's movements can be executed without impeding the rest of the equipment on platform 10; and without the movements of the robot being impeded by this equipment. It should also be appreciated that, if the need arises, extension piece 30 can pivot beyond 90°.

In the foregoing description, the movement of the extension piece was considered as a means of positioning the robot. It is also possible, however, to design the extension piece in such a way so that its pivoting is integrated in the many possible movements of the robot itself.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. Apparatus for lining the inner wall of a vessel with bricks, the vessel having a vertical axis and comprising:

work platform means, said platform means being vertically movable within a vessel and being capable of rotating about the vertical axis of the vessel;

robot means, said robot means including manipulating means for manipulating and laying bricks on the inner wall of the vessel and articulated arm means having opposed first and second ends, said manipulation means being mounted on said first end of said articulated arm means;

support means, said second end of said articulated arm means being mounted ons aid support means; and extension member means having a first end and a second end, said first end of said extension member means being pivotably mounted on said work platform means wherein said extension member means is pivotable 360 degrees about a first vertical axis, said support means being pivotably mounted on said second end of said extension member means wherein said support means is pivotable 360 degrees about a second vertical axis.

2. Apparatus according to claim 1 wherein:

the pivoting of said extension member means is integrated in the movements of said robot means.

* * * * *